I. D. ZITZERMAN.
LOCK NUT.
APPLICATION FILED SEPT. 26, 1912.
1,063,146.
Patented May 27, 1913.
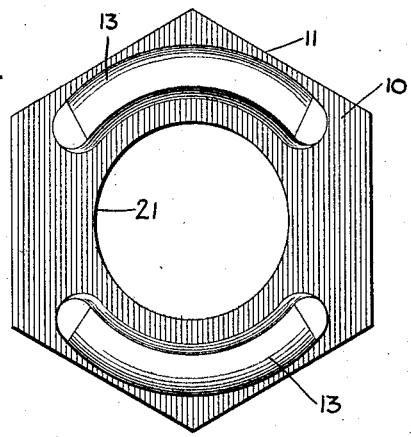
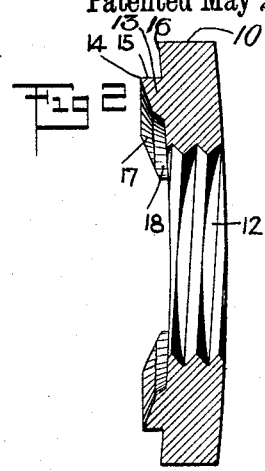
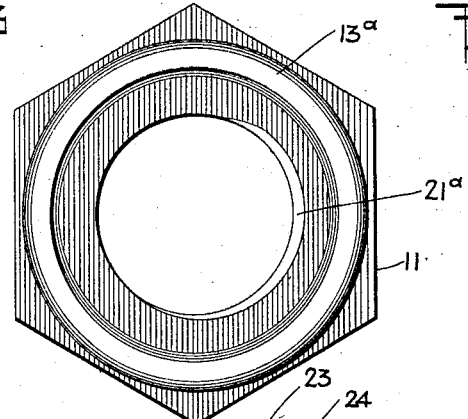
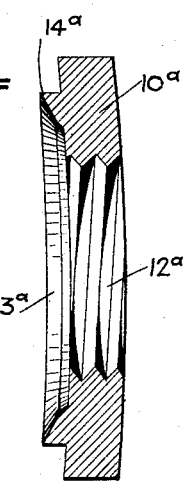
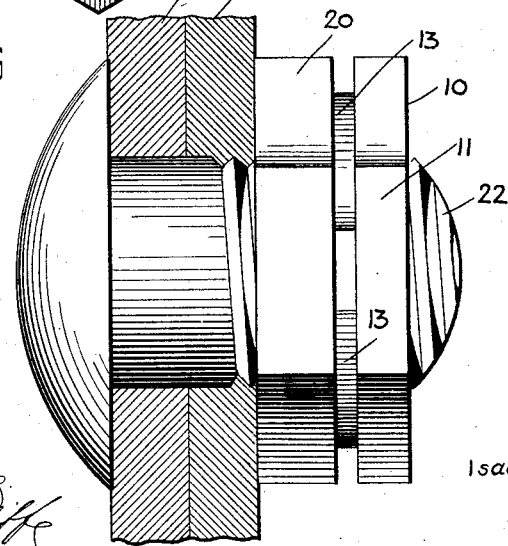
WITNESSES
INVENTOR
Isaac D. Zitzerman
BY
ATTORNEYS

UNITED STATES PATENT OFFICE.

ISAAC D. ZITZERMAN, OF KANSAS CITY, MISSOURI.

LOCK-NUT.

1,063,146.  Specification of Letters Patent.  Patented May 27, 1913.

Application filed September 26, 1912. Serial No. 722,437.

*To all whom it may concern:*

Be it known that I, ISAAC D. ZITZERMAN, a citizen of the United States, and a resident of Kansas City, in the county of Jackson and State of Missouri, have invented a new and Improved Lock-Nut, of which the following is a full, clear, and exact description.

The invention relates to lock nuts to be employed with the ordinary nuts of bolts in railway joints, and in other situations where nuts are subjected to vibration.

My invention relates particularly to concave lock nuts.

It is a design of my invention to provide a lock nut having a concave side and in which the threads will be free from mutilation at the concave side and thus readily engage a bolt.

It is furthermore a design of the invention to provide a lock nut having a novel arrangement of the gripping means for engaging the opposed face of the ordinary nut with increased effectiveness.

The invention also has for its design the production of a lock nut that will afford effective engagement with a wrench.

The invention will be particularly explained in the specific description hereinafter to be given.

Reference is to be had to the accompanying drawings forming a part of this specification, in which corresponding characters of reference indicate corresponding parts in all the views.

Figure 1 is a rear view of a lock nut embodying my invention; Fig. 2 is a cross section; Fig. 3 is a rear view of a different form of the improved lock nut more particularly adapted for use in connection with faced nuts; Fig. 4 is a cross section of the form shown in Fig. 3; and Fig. 5 is a side elevation showing my improved lock nut applied to a bolt or nut, and two members clamped thereby, said members being shown in section.

Referring especially to the form shown in Figs. 1 and 2, the lock nut 10 is hexagonal or otherwise formed with a plurality of faces 11 for the engagement of a wrench, and is provided with a threaded bore 12. On the inner face of the nut are formed projecting means to engage and bite into the outer face of an ordinary nut.

The device shown in Fig. 2 has a gripping means in the form of two segmental or crescent-shaped ribs 13, concentric with the threaded eye or bore 12, and the said ribs are of such shape in cross section as to present a comparatively sharp edge 14 concentric with the eye 12. Preferably the edge is formed by producing the outer side of the rib perpendicular to the inner face 16 of the lock nut, and forming the front face 17 of the rib at a slightly acute angle to the outer wall 15, the said face 17 being at an angle also to the inner side wall 18 of the rib, preferably an obtuse angle; the result is that the rib will have a sufficiently sharp edge 14 to properly engage the face of a nut, as 20, to be locked.

It will be seen from Figs. 1 and 2 that the concave form given to the nut is produced without mutilating the thread at the inner concave face of the nut, but on the contrary the thread extends continuously from the point of entrance 21 to the interior of the eye, while in certain known forms of lock nuts concavity is produced at the expense of the threads, the concaved lines cutting the threads and mutilating the same, producing separated portions of the thread at diametrically opposite sides of the eye, the result being that difficulty and inconvenience are experienced in engaging the lock nut with the threads of a bolt.

In practice, the bolt as 22, is passed through the members to be clamped, such as elements 23, 24. An ordinary nut 20 is then run onto the bolt against the face of the outer element 24, and the lock nut takes onto the bolt outside of the nut 20. When the edges 14 of the ribs 13 come to a bearing against the outer face of the nut 20, the further turning of the lock nut causes the ribs to engage the nut 20 at diametrically opposite points, or substantially so, and the further screwing up of the lock nut will cause it to flatten out and assume a plane parallel with the inner nut, or approximately so, the changing of the form of the lock nut from the concave form to the flattened form serving to effectively bind the lock nut on the threads of the bolt, as will readily be understood. The nut being bodily concaved, and therefore not having its thickness reduced at any point, and being provided with the faces 11, the lock nut lends itself effectively to the engagement of a wrench, and no difficulty is experienced by slipping of the wrench.

The described form is particularly efficient with unfaced inner nuts, as the separate concentric ribs 13 accommodate the lock nut to any unevenness presented by the nut.

In the form shown in Figs. 3 and 4, the gripping rib 13ª is continuous, and said rib follows the bodily concavity of the lock nut 10ª. The continuous rib engages perfectly with a faced nut. Since the rib follows the concavity of the body 10, there will be two diametrically opposite bearing lines, as will be readily understood. The gripping rib 13ª is formed with an edge 14ª, similar to that in the construction previously described. Fig. 3 shows very clearly that the concaving of the lock nut does not produce any mutilation of the thread, which is continuous from the entrance 21ª inward through the eye. When tightened down the nut presents a level surface so that a second lock nut can be used if desired.

Having thus described my invention, I claim as new, and desire to secure by Letters Patent,—

1. A lock nut concaved bodily and having a threaded eye, the thread extending without mutilation from a single starting point at the concaved face of the lock nut, the said concave face having a ribbed formation presenting bearing edges at diametrically opposite sides of the eye, the said bearing edges presenting curved lines concentric with the eye of the nut.

2. A lock nut, having a ribbed formation at the inner face, said ribbed formation terminating in an edge defined by an outer perpendicular wall, and a face at an acute angle to said perpendicular wall, there being an inner wall at an angle to the said face.

In testimony whereof I have signed my name to this specification in the presence of two subscribing witnesses.

ISAAC D. ZITZERMAN.

Witnesses:
HARRY L. SHIPMAN,
EDWARD D. HEATH.

Copies of this patent may be obtained for five cents each, by addressing the "Commissioner of Patents. Washington, D. C."